United States Patent
Poreda et al.

(10) Patent No.: US 7,818,120 B2
(45) Date of Patent: Oct. 19, 2010

(54) ROUTE-PLANNING INTERACTIVE NAVIGATION SYSTEM AND METHOD

(75) Inventors: Stanley J. Poreda, Bristol, RI (US); Peter Allmond Tinker, West Hills, CA (US)

(73) Assignee: Raytheon Company, Waltham, MA (US)

( * ) Notice: Subject to any disclaimer, the term of this patent is extended or adjusted under 35 U.S.C. 154(b) by 261 days.

(21) Appl. No.: 11/606,764

(22) Filed: Nov. 30, 2006

(65) Prior Publication Data
US 2008/0133131 A1    Jun. 5, 2008

(51) Int. Cl.
*G01C 21/30* (2006.01)

(52) U.S. Cl. ........................ 701/209; 701/117; 701/200; 701/201; 701/300; 701/301; 342/357.01; 342/357.06; 342/357.12; 342/357.13; 342/41

(58) Field of Classification Search .............. 701/200, 701/96, 201, 300, 301; 342/357.01, 357.11, 342/357.12, 357.14
See application file for complete search history.

(56) References Cited

U.S. PATENT DOCUMENTS 4,138,752 A * 2/1979 Dickson ................... 441/23
5,172,321 A   12/1992 Ghaem et al.

(Continued)

FOREIGN PATENT DOCUMENTS

KR    1019980046502 A    9/1998

(Continued)

OTHER PUBLICATIONS

Notification Concerning Transmittal of International Preliminary Report on Patentability (Chapter 1 of the Patent Cooperation Treaty), PCT/US2007/084457, Jun. 11, 2009.

(Continued)

*Primary Examiner*—Tuan C To
*Assistant Examiner*—Redhwan Mawari
(74) *Attorney, Agent, or Firm*—Glenn H. Lenzen; Polsinelli Shughart PC

(57) ABSTRACT

Provided is a system and method for route planning and evaluation. The system includes a host object location device operable to provide the location of a host object over the passage of time. A sensor is also provided, operable to sense objects and data from an environment proximate to the host object. A computer is operatively coupled to the location device, the sensor device, a chart library and a display. The computer includes a route generator operable to generate a predicted route of at least one sensed object. The route generator is also operable to generate a planned route of the host object. The planned and predicted routes are displayed to an operator upon the display. In response to a predicted proximate convergence of the host object and at least one sensed object, the convergence signaled to the operator. The planned position of the host object and the predicted position of each sensed object are displayed as an animation to evaluate the planned route, for any time following the present time, the operator permitted to stop the animation and scroll the animation forward and backwards.

18 Claims, 6 Drawing Sheets

U.S. PATENT DOCUMENTS

| | | | |
|---|---|---|---|
| 5,184,303 A | 2/1993 | Link | |
| 5,285,391 A | 2/1994 | Smith, Jr. et al. | |
| 5,347,910 A | 9/1994 | Avila et al. | |
| 5,610,821 A | 3/1997 | Gazis et al. | |
| 6,044,323 A | 3/2000 | Yee et al. | |
| 6,128,574 A | 10/2000 | Diekhans | |
| 6,151,539 A * | 11/2000 | Bergholz et al. | 701/25 |
| 6,216,086 B1 | 4/2001 | Seymour et al. | |
| 6,249,241 B1 * | 6/2001 | Jordan et al. | 342/41 |
| 6,396,577 B1 | 5/2002 | Ramstack | |
| 6,408,248 B1 | 6/2002 | Yancey, Jr. et al. | |
| 6,415,227 B1 | 7/2002 | Lin | |
| 6,577,947 B1 * | 6/2003 | Kronfeld et al. | 701/202 |
| 6,611,754 B2 | 8/2003 | Klein | |
| 6,937,869 B1 | 8/2005 | Rayburn | |
| 2004/0246256 A1 * | 12/2004 | Parakkuth et al. | 345/501 |
| 2005/0187714 A1 * | 8/2005 | Brulle-Drews | 702/3 |
| 2006/0064242 A1 * | 3/2006 | Litvack et al. | 701/202 |

FOREIGN PATENT DOCUMENTS

| | | | |
|---|---|---|---|
| KR | 20020018332 | * | 8/2002 |

OTHER PUBLICATIONS

Written Opinion of the International Searching Authority, PCT/US2007/084457, Jun. 5, 2008.

* cited by examiner

ROUTE-PLANNING INTERACTIVE NAVIGATION SYSTEM AND METHOD

FIELD

This invention relates generally to the field of route planning systems, and more specifically to a route-planning interactive navigation system and method applicable in a maritime environment.

BACKGROUND

The widespread use of radar and modern navigation aids such as GPS and electronic charts has greatly improved maritime safety. However, even with these tools, the modern navigator is faced with challenges of ever increasing maritime traffic. Not only is traffic increasing, but so to are the size of such vessels.

The presence of nearby moving surface vessels greatly complicates the task of finding a safe and timely path to a destination. In many situations it may not be judicious to simply plot a straight course and handle encounters with other vessels as they occur.

Whereas with passage over streets and highways, the physical structures impose restraints on where vehicles will be and when paths are likely to cross, in the maritime environment there is a great deal more flexibility as well as ambiguity. In addition, the turning radius and minimum distances required to alter heading or significantly change speed are often quite large, especially for large vessels. As such, plotting a straight course with the intention of altering course on a 'come-as-what-may' basis may well result in unexpected time delays, increased fuel consumption and wear and tear on physical systems.

Route planning, especially in the maritime environment, typically requires the navigator to plot a course with the anticipation of two, three or even more encounters over relatively short intervals of time. In order to accomplish this task the navigator must visualize dynamic navigation geometry and be able to quickly adapt to changes in information. These changes may include initial detection of nearby vessels, updates in the speed and heading of known nearby vessels, as well as other factors. As this information can and often does change quite rapidly, the navigator will frequently be called upon to make rapid changes and revisions to the planned route of the ship over the entire course of the planned route.

The general approach used in maritime route-planning is to select an ordered set of waypoints, starting at the present position and ending at a destination. These waypoints are selected so that the route that results from the piece-wise linear path obtained by sequentially passing through these waypoints is feasible and efficient. A path is feasible if it observes specified maneuverability constraints and if it avoids obstacles, restricted areas, and applicable navigation rules. A path is efficient if by some measure, there are not other feasible routes that are superior. The measure used may for instance be transit time, route length, number of course changes, the probability of colliding with an obstacle, or some combination. Obstacles may be described as a bounded area such as an ellipse, or they may be described as a two-dimensional probability density.

Although such a problem can be mathematically formulated without much difficulty, there are currently no known general existence and uniqueness theorems or characterizations of optimal solutions that may be applied. Indeed, although an optimal solution may be found through enumeration, the time needed to generate a solution will in most cases render the solution moot in applicability.

This computational difficulty is magnified by the fact that the navigator may not have knowledge of the navigational intentions of nearby vessels. In arriving at a planned route that is both safe and feasible, the navigator is therefore required to predict the future course and speed of these vessels. This forces the navigator to utilize planning intervals that are typically quite small. The result is that the resulting route is usually inefficient.

Planning a route for one short interval after another without attempting to perceive the overall route and how each segment is involved can have drawbacks, as the navigator may not properly perceive or identify trends or issues that are likely to be of significant concern at a future time. In other words the aggregate effect if implemented all at once is likely to be experienced more profoundly then are the small modifications made in each planning interval.

Hence, there is a need for a route-planning navigation system that overcomes one or more of the issues and problems identified above.

SUMMARY

This invention provides a route-planning and evaluation system and associated method.

In one embodiment of the present invention, provided is a route-planning and evaluation system comprising a situation display common to existing navigation systems, that in addition to showing the present position and planned route of the host object relative to other objects and to the shoreline or other boundary, also displays the future course and speed of nearby objects. This situation displays further provides an animation of the host object's movement along the planned route. This animation includes representation of the movement of nearby objects along their predicted routes. The animation is controlled in the same way as is a video play-back device: it can be played at variable speeds, forward and backward in time, and it can be stopped to yield a freeze frame at any point. This will allow the navigator to carefully observe all aspects of the planned route and in particular to observe predicted close encounters to other ships. In this embodiment the system also comprises a personal entry device that allows the navigator to adjust navigation constraints in response to these examinations. These constraint changes can include the addition, deletion, or adjustment in position of waypoints. The operator can then enter a command for the generation of a new planned route. This process can be repeated several times before the navigator chooses to enter a command to accept the planned route. Following route acceptance the situation display of this embodiment will generate an alarm if the planned route is no longer safe or that a better planned route is possible.

In yet another embodiment, provided is a method of planning and evaluating routes, comprising receiving from a GPS (Global Positioning System) device, a location and velocity for a host vessel. In addition, data from an onboard radar system is used to estimate the location, heading and speed of nearby vessels. This information is then combined with data from an electronic maritime chart library to create a representation of the host vessel and nearby vessels relative to proximate navigable waterways. This information is then used along with applicable navigation rules to generate predicted routes for these nearby vessels. The method of this embodiment additionally accepts one or more navigation constraints for the host vessel from the operator and then generates a planned route for the host vessel that observes these constraints. Navigation constraints will generally include a destination and a closest approach distance for nearby vessels. Other constraints may include minimum water depth, closest approach distance for fixed objects, and intermediate waypoints. This embodiment then displays the planned route for the host vessel and the predicted routes of nearby vessels as an animation that can be adjusted by the operator to allow for careful evaluation of the planned route, particularly as it passes in close predicted proximity to nearby vessels. Following operator acceptance of a planned route this embodiment of the method continues to receive radar and GPS data, update the predicted routes of nearby vessels, and determine if the planned route is predicted to observe the navigation constraints imposed by the operator. In the event that a predicted violation is determined, this embodiment signals the operator.

DETAILED DESCRIPTION

Before proceeding with the detailed description, it is to be appreciated that the present teaching is by way of example only, not by limitation. The concepts herein are not limited to use or application with a specific system or method for route planning whether in a maritime environment or other environment. Thus, although the instrumentalities described herein are for the convenience of explanation, shown and described with respect to exemplary embodiments, it will be appreciated that the principles herein may be applied equally in other types of systems and methods involving route planning, and more specifically interactive route planning.

Figure 1:
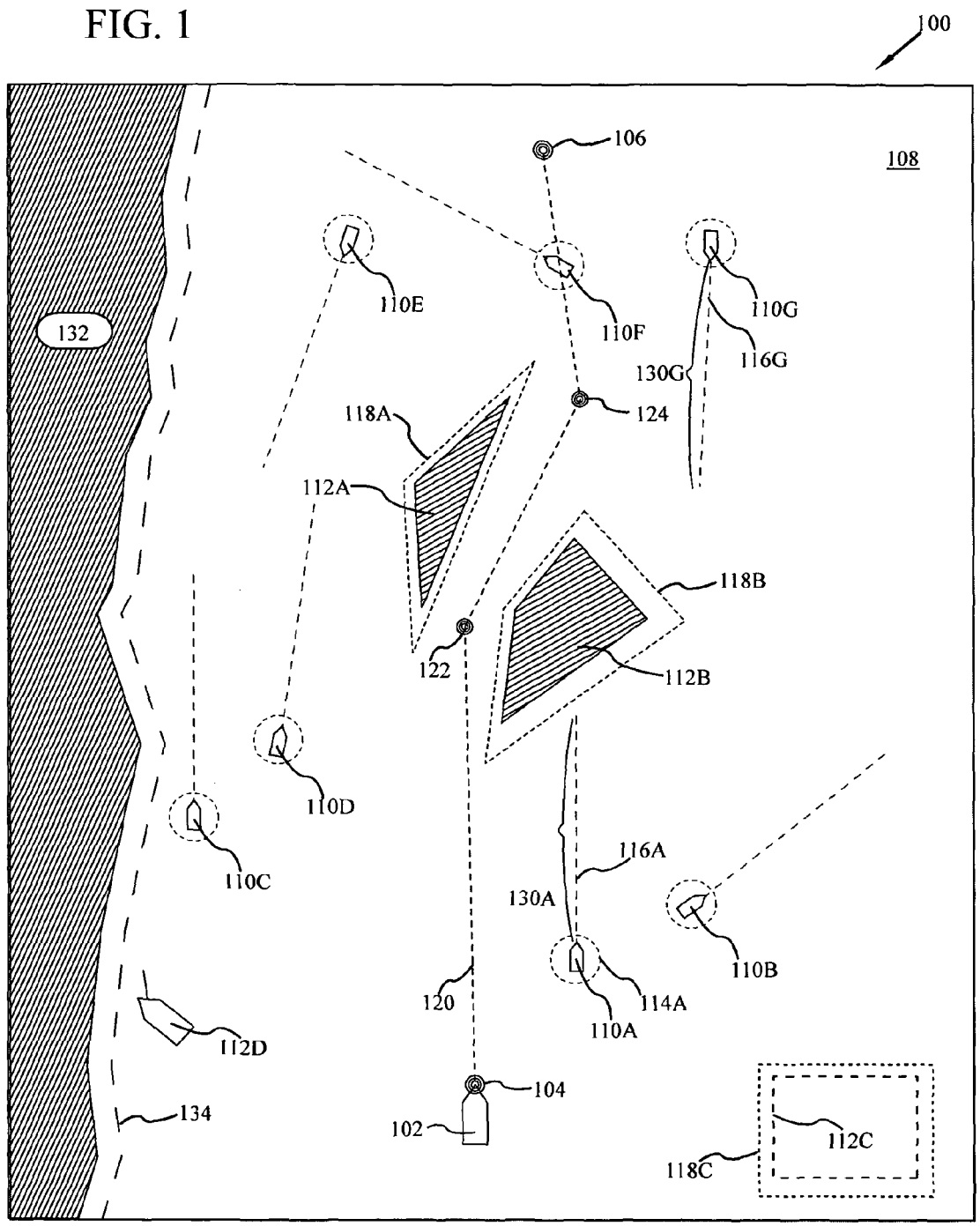
FIG. 1 is a high level depiction of a display rendered in accordance to an embodiment of the route-planning navigational system.

Referring now to the drawings, and more specifically FIG. 1 there is shown a route-planning interactive navigational system ("RPINS") 100 according to at least one embodiment. FIG. 1 illustrates a navigational situation, wherein it is desired to navigate host object, e.g. a host vessel or host ship 102, from an initial location 104 to a destination 106 within an environment 108. In at least one embodiment the environment 108 is a maritime environment, and such is the example shown. It is of course understood and appreciated that other environments, such as, but not limited to, a terrestrial or in particular a shop floor environment, may also be applicable. As such, although the following description regards a maritime environment wherein the host object is a host ship and proximate objects within the environment 108 are ships, it is understood that the host object and proximate sensed objects may take a variety of different forms as appropriate for the environment in which RPINS 100 is utilized.

As shown in FIG. 1 there are objects present in the environment. For the sake of example these objects are limited to ships 110, of which ships 110A~110G are exemplary, and stationary objects 112, of which 112A, 112B, 112C, and 112D are exemplary. More specifically, 112A and 112B are potentially land objects and therefore stationary, 112C is a fish farm and 112D is a ship in a permanent mooring. Associated with each ship 110 is a depicted minimum distance perimeter 114. It is understood that each ship 110A~110G may have different minimum distance perimeter 114A~414G, however all have been drawn as the same for ease of discussion and illustration.

Each ship 110A~110G has a heading indicated by the orientation of the depicted ship 110A~110G, and specifically dotted line 116A~116G. The predicted route 130A~130G of each ship 110A~110G is further discussed below.

Each stationary object 112A, 112B may have a corresponding keep-out area such as 118A, 118B, 118C. Keep-out areas may also exist without a stationary object, however none are shown in the illustrated example. A shoreline 132 and associated keep-out area 134 are also indicated.

As shown in FIG. 1, a route illustrated as a dotted line 120 indicates at least one planned route for host ship 102 from initial location 104 to destination 106. Planned route 120 passes between stationary objects 112A and 112B and avoids keep-out areas 118A and 118B. Although ship 110F is currently shown as being in the way, as ship 110F has a heading 116F, ship 110F will have moved out of the way by the time host ship 102 has reached that point of the route. In addition, as the movements of other ships 110A~110G may change over time, RPINS 100 may revise planned route 120 before destination 106 is reached.

Figure 2:
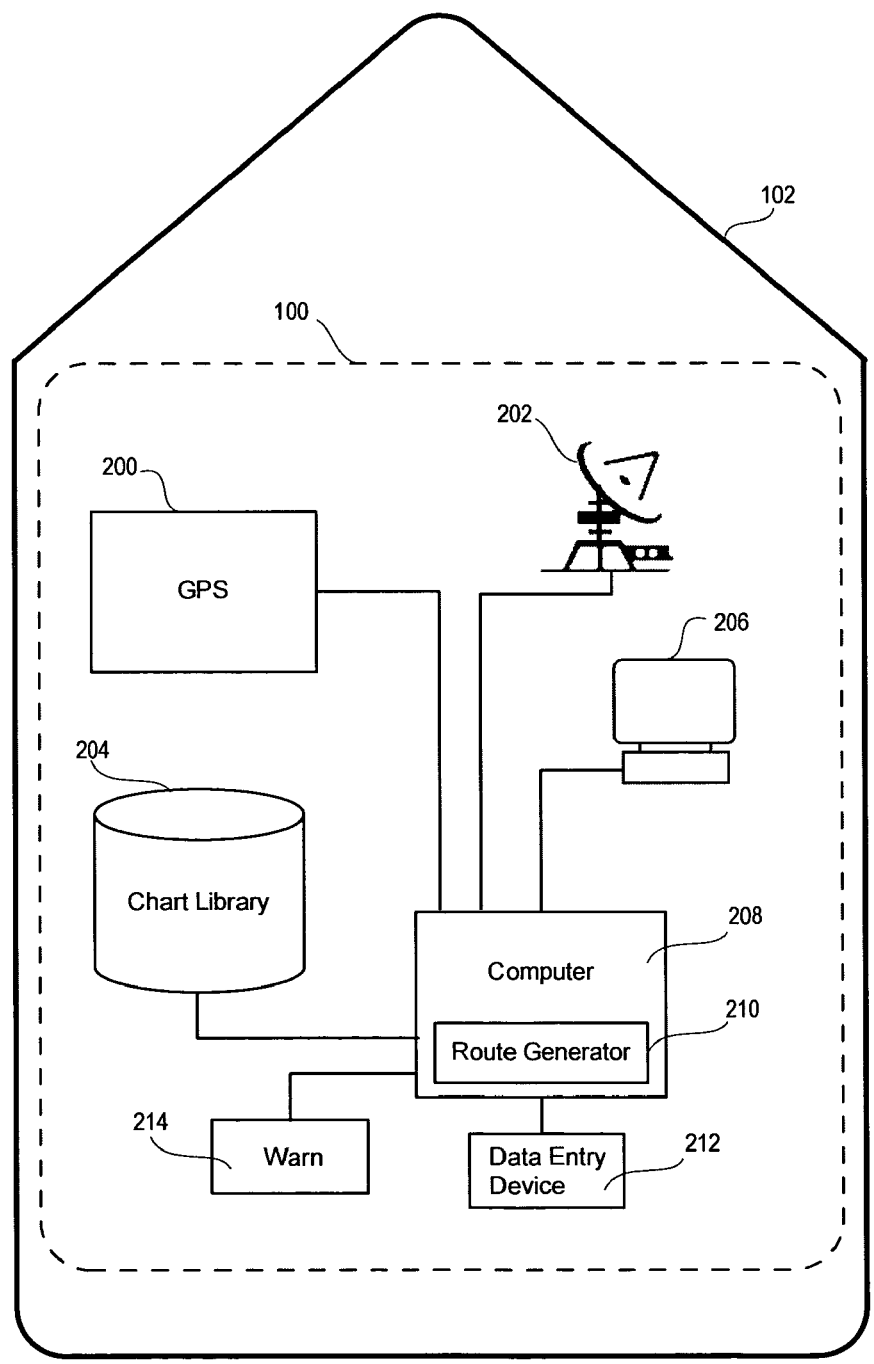
FIG. 2 is a block diagram of the route-planning navigational system as provided on a ship in accordance with an embodiment of the present invention.

A conceptual block diagram of RPINS 100 is presented in FIG. 2. More specifically, in at least one embodiment, RPINS 100 has a host ship location device 200, at least one sensor 202, an electronic maritime chart library 204, a display 206 and a computer 208. As shown, the computer 208 is operatively coupled to the location device 200, the sensor device 202, the chart library 204 and the display 206.

RPINS 100 also typically includes at least one operator data entry device 212, such as for example a keyboard. As indicated, in at least one embodiment RPINS 100 is disposed upon the host ship 102. A warning system or device 214 is also provided in at least one embodiment, and/or may be incorporated as part of the display 206

The host ship location device 200 is operable to provide the location of the host ship, and more specifically the location of the host ship over the passage of time. In at least one embodiment, the host ship location device 200 is a GPS system. The sensor 202 is operable to sense objects and data from an environment proximate to the host ship. In at least one embodiment the sensor 202 is a transceiver that may actively sense objects. In another embodiment, the sensor 202 is a receiver that receives navigation data for nearby vessels. In at least one specific embodiment, the sensor 202 is radar. In at least one alternative embodiment, the sensor 202 is composed of multiple transceiver, transmitter, receiver, and/or other devices and combinations thereof, as may be used to gather information and data from objects and an environment.

The computer 208 includes a route generator 210. The route generator 210 is operable to generate a predicted route of at least one sensed object in the environment (e.g. route 130A for ship 110A, see FIG. 1). The route generator is also operable to generate a planned route of the host ship (e.g. route 120 for host ship 102).

Many problems, and the algorithms that may be applied to them, are linear. If the input is doubled or tripled, the solving operation will take correspondingly take double or triple the time to complete. Others may be quadratic, cubic or to some other power. Problems for which it is not possible to generate a the solution in polynomial time, are referred to as "NP-hard" (for nondeterministic polynomial).

The problem of finding a route in the presence of moving obstacles is in general NP-hard. NP-hard problems are well known and frequently encountered, and enumeration is the only algorithm that will always lead to their solution. A fast algorithm is one that will return the best, or at least a reasonable solution quickly enough for the solution to actually be useful. If the solution takes years to compute, it is quite likely that the term of usefulness will have long expired.

The "System and Method for Adaptive Path Planning" [U.S. patent application Ser. No. 10/811,460, Regina I. Estkowski, et al., now U.S. Pat. No. 7,447,593] is an algorithm for creating possible routes for a vehicle through a given space, with specified dynamic and stationary obstacles. In at least one embodiment the route generator is utilizing this algorithm.

The planned route 120 of the host ship 102 and the predicted route 130 of the sensed object(s) 110 are conveyed to an operator as visual information upon the display 206. Further, as the computer 208 is operable to analyze the planned and predicted routes, in response to a predicted proximate convergence, a collision warning 214 is provided to the operator. For example, such a warning 214 may be an alarm, a flashing light, a vibrating pager, an onscreen display message, or other such indicator. Moreover, in at least one embodiment, the collision warning 214 is selected from the group consisting of, an audible signal, a visual signal, a tactile signal and/or combinations thereof.

In at least one embodiment, the planned position of the host ship and the predicted position of each sensed object are advantageously displayed as an animation to the operator. Moreover, in at least one embodiment the animation replaces the situation display upon an operator command, and the situation display may be restored in the same way. In yet another embodiment, the animation may be superimposed upon the situation display. Depending on operator preference the animation may display most if not all of the elements typically shown on the situation display. Further the animation has the same scale and orientation so that the operator can relate it directly to the current situation display. In embodiments where the animation replaces the situation display, the operator is informed that the view is that of an animation and not the actual situation display.

With respect to the animation, the operator is permitted to adjust the speed of the animation, to stop it, and scroll the animation forward and backwards. The ability to stop and scroll the animation permits the operator to inspect specific forecasts of position of the host ship and any sensed objects in the environment.

The animation further permits the operator to gain awareness for possible points of convergence between the planned route and the predicted routes with sufficient forewarning so as to permit alteration of the course well in advance. Such advance knowledge may be advantageous in avoiding stress upon the host ship and its engines as might be incurred in changing course to avoid imminent collision. Such advance knowledge also helps to avoid inefficient maneuvers that degrade overall performance such as transit time.

Figure 3:
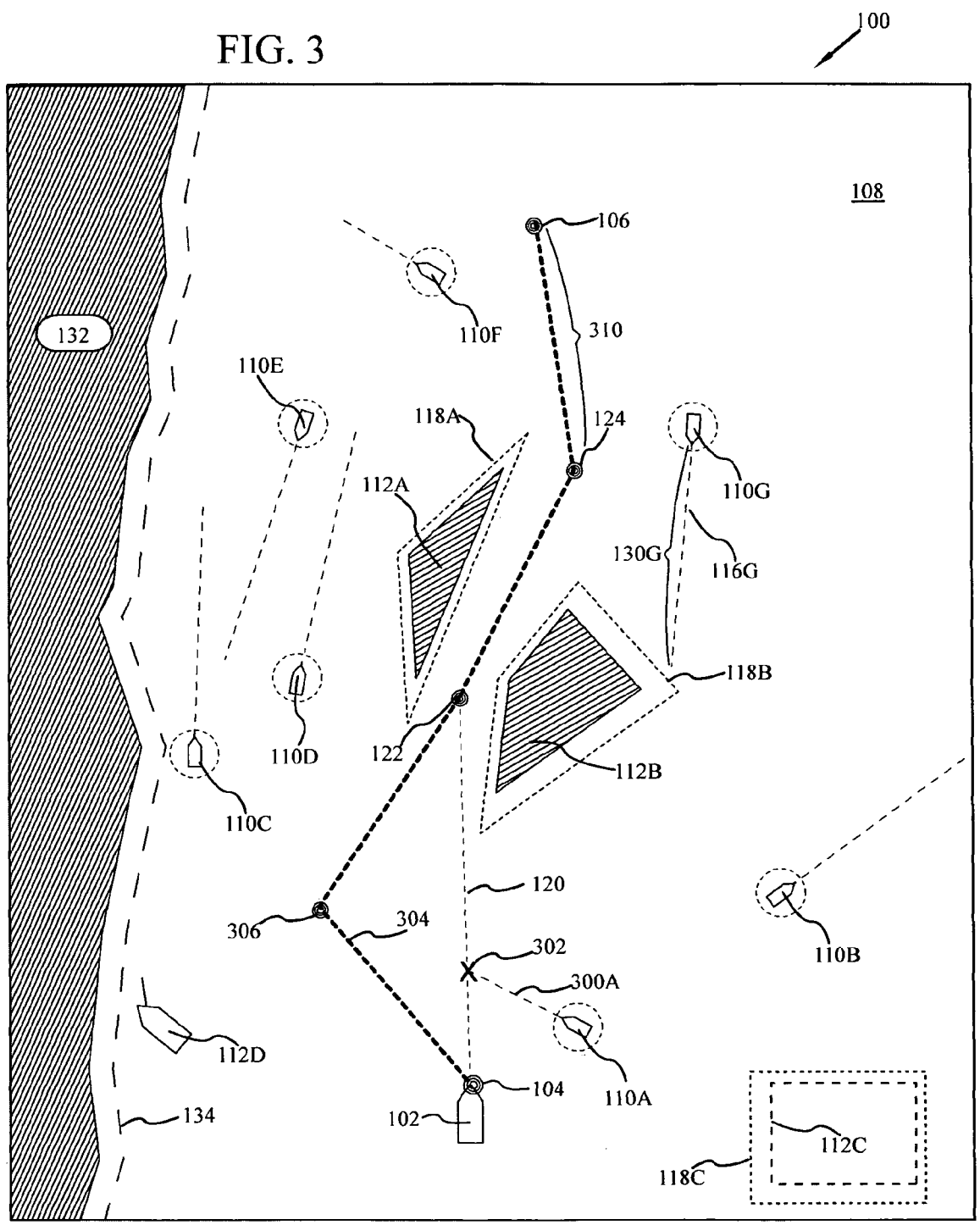
FIG. 3 is a variation of FIG. 1 depicting the relative change of position of objects, planned and predicted routes, and a proximate convergence as predicted in accordance with an embodiment of the present invention.
Figure 4:
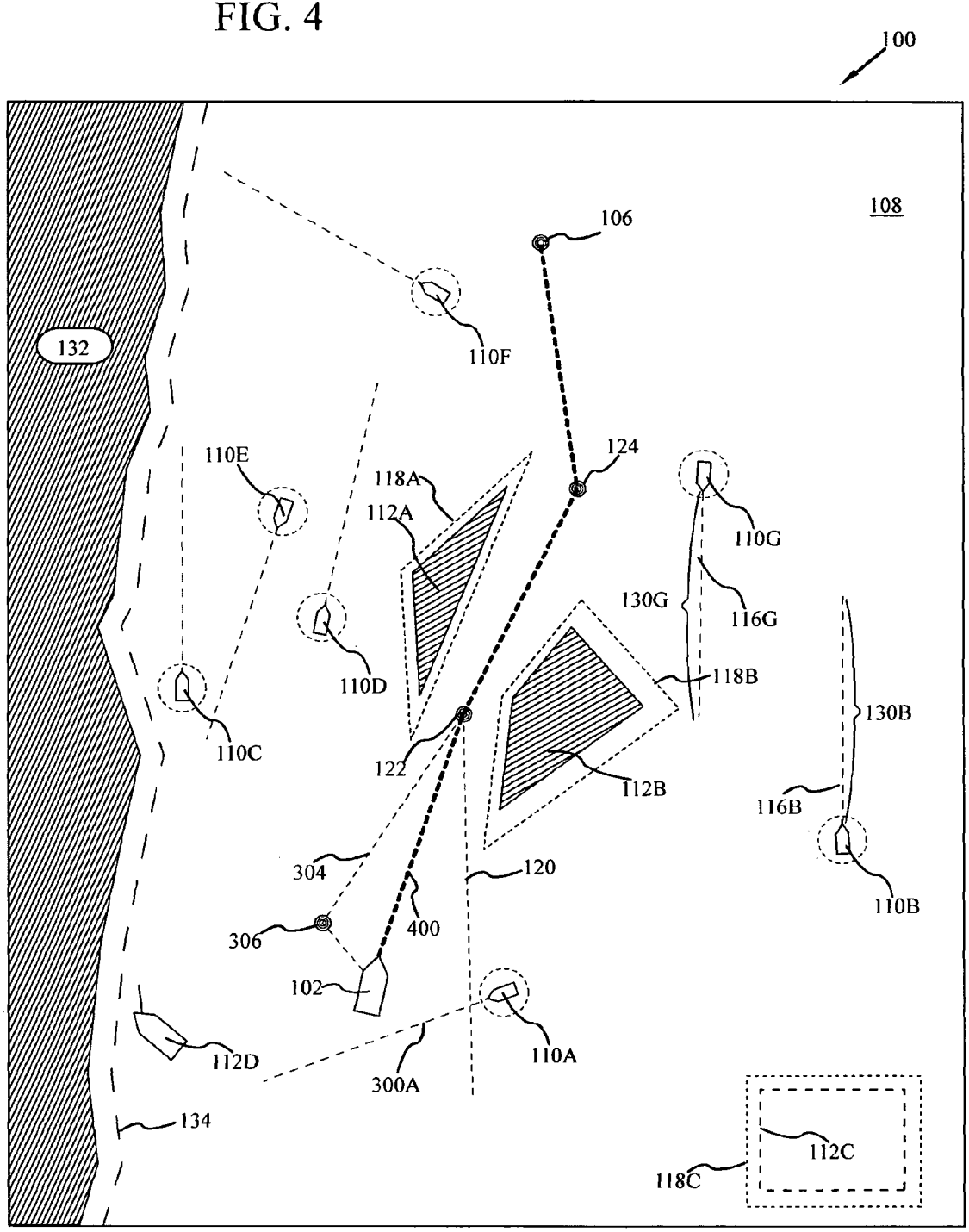
FIG. 4 is a variation of FIG. 3 depicting a revised planned route and predicted routes in accordance with an embodiment of the present invention.
Figure 5:
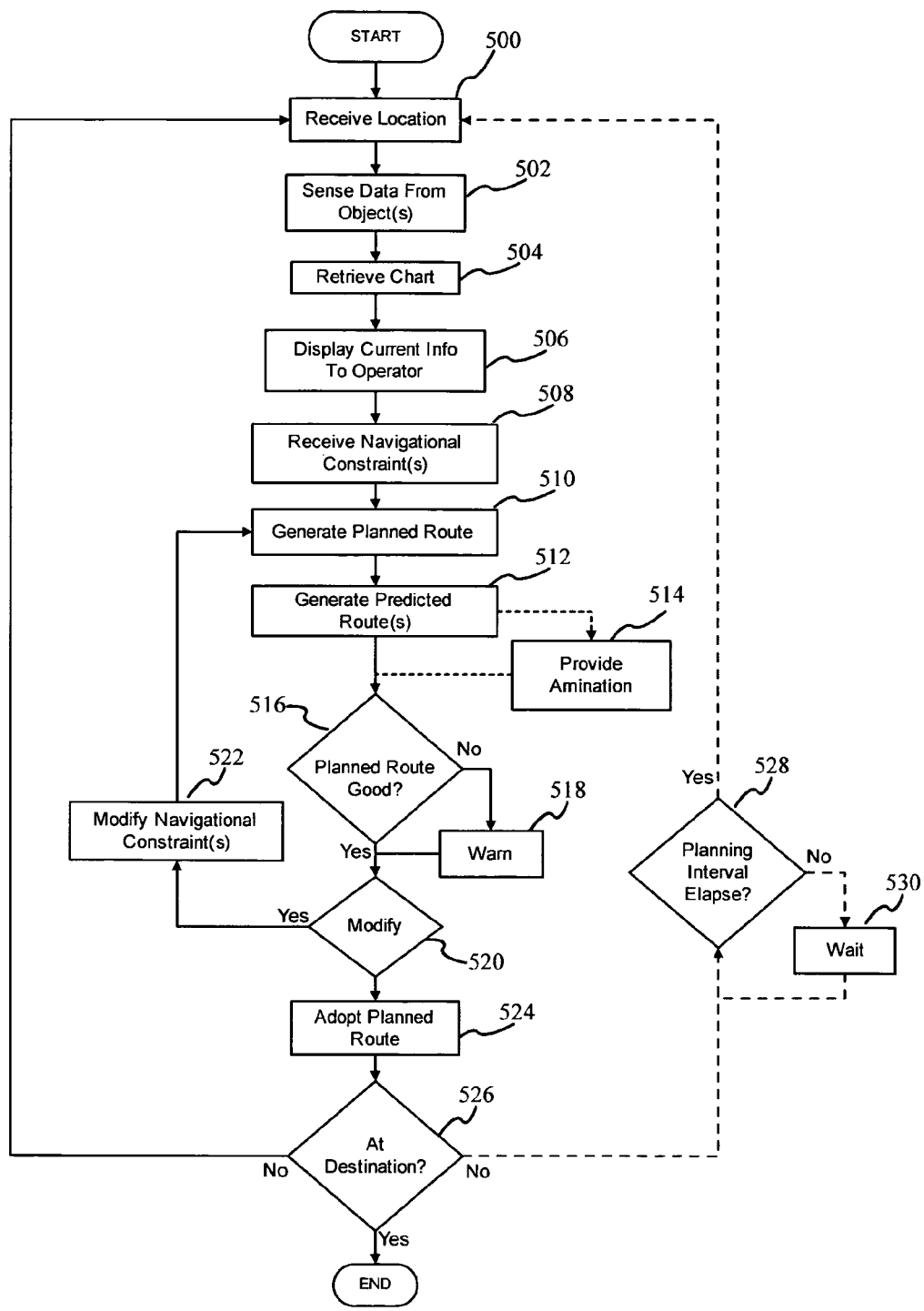
FIG. 5 is a high level flow diagram of a method embodiment of the present invention.

Having introduced the general elements of RPINS 100, a more detailed discussion of at least one embodiment to apply RPINS 100 is now provided with respect to FIGS. 1~4 and the flow diagram of FIG. 5.

With respect to FIGS. 1, 3 and 4, in at least one embodiment the illustrations provided may be considered to correspond generally to specific instances in the depiction and animation of the known, planned and predicted positions of the host ship 102 and ships 110A~110G within environment 108. It is understood and appreciated that the display may incorporate color as well as other information not shown or otherwise indicated in the provided figures. FIGS. 1, 3 and 4 have been rendered very simply for ease of illustration and discussion.

FIG. 5 presents a high level flow diagram, that in connection with FIGS. 1~4 presents a method for at least one embodiment of route planning and evaluation. It will be appreciated that the described method need not be performed in the order herein described, but that this description is merely exemplary of at least one preferred method of route planning and evaluation.

As shown in FIG. 5, the method typically commences with receiving from a location device (e.g. location device 200 in FIG. 2), the location and velocity for the host ship 102, block 500. In addition, data is sensed from objects present in within the environment 108, block 502. Environmental data may also include wind speed, wind direction, ocean current speed, ocean current direction, and temperature. Environment data may also include navigation data transmitted by nearby ship objects 110A~110G, and other data points as may be desired in the determination of route planning for the host ship 102 and route prediction for sensed objects (e.g. ships 110A~110G).

Based upon the determined location of the host ship 102, a chart containing the location of the host ship 102 is retrieved from an electronic maritime library (e.g. library 204 in FIG. 2), block 504. The current position of host ship 102 and any sensed objects 110, 112 are displayed to the operator, block 506. It will be appreciated that any and all information contained on a standard navigation chart can also be included in this display. Such information includes depth indications, location of navigation markers, and areas that are restricted.

From the operator and/or the maritime library, at least one navigation constraint is received, block 508. In at least one embodiment, the navigational constraint is selected from the group of a navigation rule, a waypoint, a keep-out area, a closest approach perimeter about an object, a destination, and combinations thereof. It is understood and appreciated that navigation rules may include "U.S. Coast Guard Rules of The Road Summarized" by Chief Warrant Officer Jim Krzenski, Commanding Officer, U.S. Coast Guard Station Fort Pierce, as well as the U.S. Coast Guard Navigation Rules—COMDTINST M16672.2D.

With respect to FIG. 1, the keep-out area 118A and 118B about stationary objects 112A and 112B may be received directly from the maritime chart. Stationary objects 112 may also have restricted areas that surround or partially surround them. In some embodiments keep out areas may be defined to include restricted areas. In alternative embodiments, keep out areas may be defined separately from and in addition to restricted areas.

In at least one embodiment, RPINS 100 provides planned and predicted routes for a planning interval. The planning interval, also referred to as a planning horizon, indicates the time interval in which the planned and predicted routes are accepted as valid. In at least one embodiment, the planning interval may be user adjusted from one planning interval to another. In other words, where there are few, if any, objects proximate to the host ship 102, the planning interval may be large, whereas if the environment is congested the planning interval may be small.

The planning interval may also be dynamically determined by the destination selected for the host ship. The time of arrival can be roughly predicted beforehand and updated by the RPINS 100 during the actual journey. Based on the arrival predicted arrival time the planning interval may be selected either the entire time period until arrival or a subinterval as determined by the operator or the RPINS system. Moreover, the planning interval may represent the entire time period for the journey to the destination, the time period for a leg of the journey or a fraction thereof.

The navigational constraint of destination 106 and/or specific waypoints and/or specific turns may be provided directly by the operator, such as by the navigator providing a specific latitude and longitude. In at least one embodiment, the operator may also indicate the destination, and/or waypoints and/or turns by use of a mouse cursor superimposed upon the displayed chart. The navigational constraint(s), potential host ship and sensed ship speeds, environmental data and host ship location and velocity are combined as collective route elements. It is understood and appreciated that although path planning may be based on waypoints, path planning may also be based on turns which collectively provide a smooth path. As used herein, the term waypoints is understood and appreciated to encompass both the traditional notion of waypoints as well as turns and curves as may be provided by an operator, generated by an algorithm, and or combinations thereof.

Based upon the collective route elements, RPINS 100 generates a planned route 120 for the host ship 102, block 510, the planned route 120 displayed to the operator upon the display. It is understood and appreciated that the generation of planned route 120 may occur substantially contemporaneously with the retrieval of the chart, block 504, and the receipt of the navigational constraints, block 508 as a combined action in displaying the current information to the operator, block 506. However, for ease of illustration and element discussion planned route generation has been shown as a separate and identified element, the order placement of which is not intended as a limitation.

In at least one embodiment, the route is a manual route based upon operator provided waypoints, e.g. waypoints 122 and 124. Each consecutive pair of waypoints defines a leg of the route, e.g. starting location 104 to waypoint 122 is a first leg, waypoint 122 to waypoint 124 is a second leg, and waypoint 124 to destination 106 is a third leg.

In at least one alternative embodiment, RPINS 100 automatically generates a planned route 120 based on the collective route elements. In such an embodiment, waypoints 122 and 124 are determined by RPINS 100 based upon the relative locations of stationary objects 112, keep out areas 118 and intended destination 106. Other collective route elements may of course affect the determination waypoints 122 and 124.

As stated above, RPINS 100 provides animation to the operator as an advantageous way to perceive and evaluate the predicted and planned routes. As the static figures accompanying this illustration can not fully depict such animation, liberty has been taken to help illustrate animation elements. For the sake of example, the planning interval in this example has been selected to be about that for shortest leg of the journey, leg 310. The planned route for the host ship 102 and the predicted routes 130A~130G of each sensed ship 110A~110G are generated for the planning interval and subsequent planning intervals, until the host ship 102 has reached it's destination or the system is otherwise halted by the operator.

Although the entire planned route may be displayed to the operator, the animation is generally provided only for each planning interval, though the RPINS 100 permits the operator to forecast and thus animate from one planning interval into the next. In addition, the animation may or may not be superimposed upon the static display.

Based upon the collective route elements, RPINS 100 generates a predicted route 130 for each ship 110, of which routes 130A~130G are exemplary, block 512. As the planning interval for this example is about that of leg 310, each predicted route 130A~130G has been illustrated as having a length about that of leg 310. The planned route and predicted routes are displayed to the operator as animation if the operator has indicated a preference for their display, optional block 514. RPINS may also display simply the planned and predicted routes without animation, rather simply displaying the planned and predicted routes upon the display as, for example, different colored lines.

It is also understood and appreciated that the predicted routes 130 for each ship 110 may be generated before the planned route 120 for the host ship 102 is generated. As noted above the order placement of block 510 is not intended as a limitation, nor is that of block 512, for in at least one embodiment the order of these blocks may be reversed. Where the predicted route(s) are generated before the planned route, the predicted route(s) 130 may be included as the collective route elements in the generation of the planned route 120.

As shown the length is relatively short in comparison to the host ship planned route 120. This is not to suggest that the host ship planned route 120 does not also have planning intervals indicated, such as by color, upon the entire planned route 120.

The use of planning intervals and comparison to the intended planned route 120 advantageously permits the host ship 102 to modify it's route well in advance of potential crisis. In at least one embodiment, evaluation of the predicted route involves comparing the planned and predicted routes for points of convergence that will occur within the planning interval, decision 516.

In the event of an evaluated convergence, the convergence is signaled to the operator, block 518. The operator may scroll the animation of the planned and predicted routes, and stop the animation so as to further evaluate the routes and the indicated point of proximate convergence. In at least one embodiment, associated with each instant depicted by the animation is a time-of-day, an elapsed time and possibly other counters that are related to the efficiency of the route such as the number of course changes that have been made. The value of the elapsed time, and any other counters that may be used, that correspond to the instant at which the host ship reaches its destination, provides a measure of performance for the planned route. In at least one embodiment, these values will be retained and used to compare the relative merits of alternative routes.

In response to the indicated proximate convergence, and/or the warning signal, the operator may choose to modify the host ship planned route, decision 520. If the decision is to modify the planned route, the operator and/or the RPINS 100 will modify one or more of the collective route elements, decision 522. As a result of the operator initiating a modification, the method re-generates the planned route, block 510.

With respect to FIG. 1, ship 110A is the closest ship to host ship 102. However, as illustrated the predicted route 130A is determined to be generally parallel to the planned route 120, and no point of proximate convergence is shown. Ship 110F is shown to be intersecting the planned route 120, however based on the planning interval and heading of ship 110F a proximate convergence is not indicated as it is predicted that ship 110F will have moved significantly by the time host ship 102 reaches the currently indicated position of ship 110F.

If the operator determines the planned route is acceptable and no modification is required, decision 520, the planned route is adopted by the operator as the current route of the host ship 102, block 524. If the destination has not as yet been reached, decision 526, the method will return to receiving the location of the host ship, block 500. Moreover, in at least one embodiment, RPINS 100 is operable to continuously revise the planned route 120 and one or more predicted routes 130. These revisions may or may not be indicated to the operator.

In at least one embodiment these revisions are indicated to the operator by continuously revising the displayed planned and predicted routes. In at least one alternative embodiment, these revisions are only indicated to the operator when a proximate convergence becomes apparent. In another embodiment, the revisions are indicated to the operator when the revised planned path and predicted paths deviate from the earlier planned and predicted routes by a user specified percentage. Moreover, in at least one embodiment, RPINS 100 will indicate to the operator that an improved planed route has been determined, and is available for adoption.

In at least one alternative embodiment, the method will wait for the planning interval to elapse, decision 528 and block 530. The location of the host ship may be continuously monitored throughout the planning interval, but they system may wait for elapse before the method repeats for predicting the routes for objects. At the onset of the next planning interval, the method repeats as shown in FIG. 5 by returning to block 500 to receive the location and velocity of the host ship.

The advantageous nature to predict proximate convergence between the planned route and at least one predicted route may be more fully appreciated with respect to FIGS. 3 and 4. In FIG. 3 the predicted route 300A of ship 110A intersects with the planned route 120 within the planning interval. As such a proximate convergence 302 is signaled to the operator.

To avoid the proximate convergence 302 as predicted, an alternate route 304 is generated. In at least one embodiment, route 304 is generated by the operator manually indicating a new waypoint 306. In at least one alternative embodiment, the new waypoint 306 is suggested by RPINS 100 based on the collected route elements.

In response to adoption of the new planned route, the method continues and RPINS 100 revises the planned route 302 and predicted routes 300A continuously or at least with the increment of each planning interval as determined by the implemented embodiment.

As shown in FIG. 4 ship 110A has again altered heading and as such is no longer posing a threat of convergence with host ship 102. RPINS 100 has further determined that an improved route 400 is available. For ease of illustration the revised portion of route 400 is shown in heavy dotted line, whereas previous portion of predicted route 304 is shown in light dotted line.

Upon the operator adopting revised route 400, RPINS 100 continues to evaluate the planned route 400 and predicted routes 300A, 130B~130G for incidence of proximate convergence within each planning interval. As shown in FIG. 4 there are no predicted points of proximate convergence. Indeed, ship 110G that appeared in FIG. 1 imposed upon planned route 120 has moved well beyond planned route 400.

Figure 6:
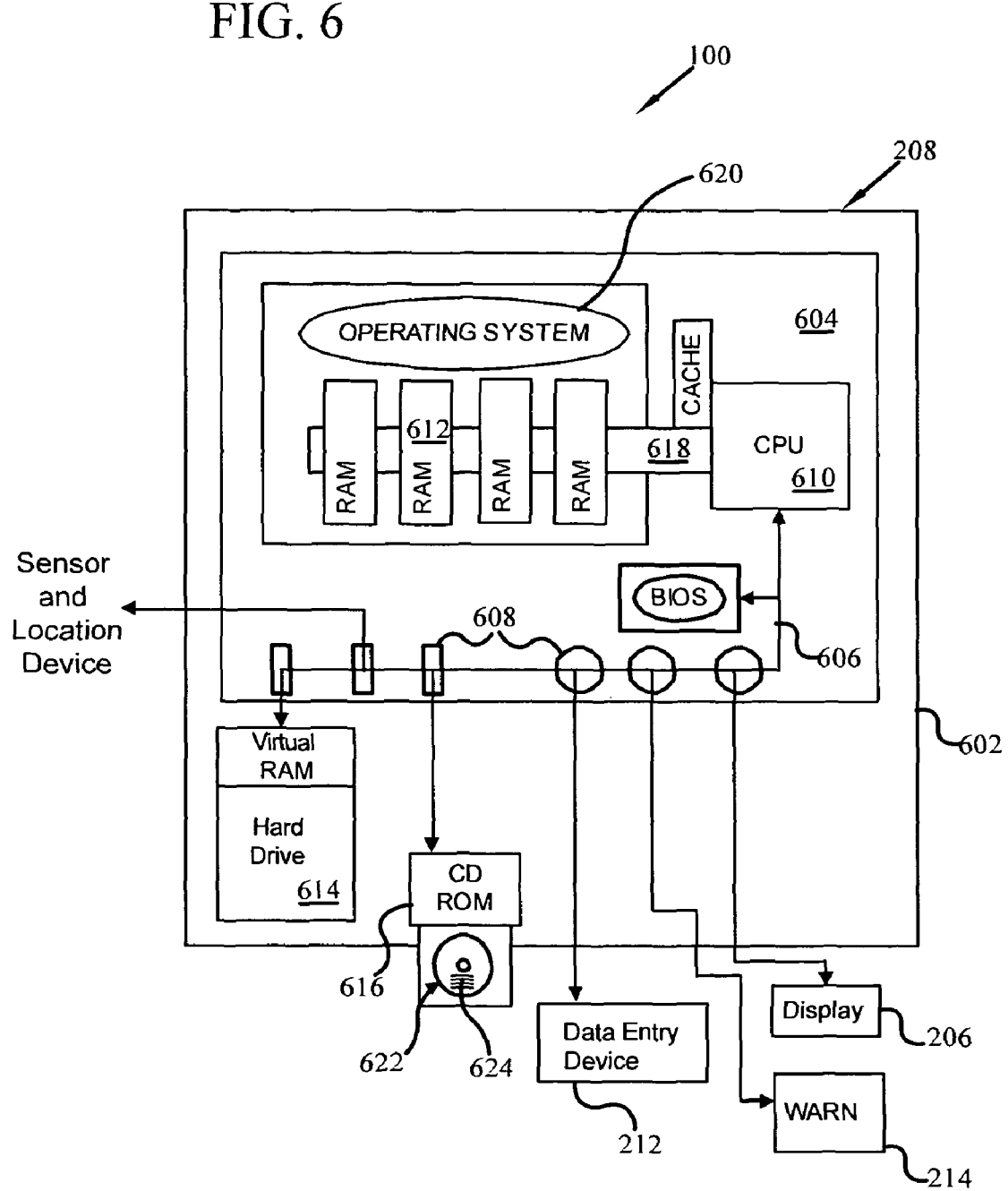
FIG. 6 is a block diagram of a computer system in accordance with one or more embodiments.

As shown in FIG. 2 and described above, in at least one embodiment, the RPINS 100 is implemented as a computer system for route-planning and evaluation. FIG. 6 is a high level block diagram of an exemplary computer 208. Computer 208 has a case 602, enclosing a main board 604. The main board has a system bus 606, connection ports 608, a processing unit, such as Central Processing Unit (CPU) 610, and a memory storage device, such as main memory 612, hard drive 614, and CD/DVD Rom drive 616.

Memory bus 618 couples main memory 612 to CPU 610. A system bus 606 couples hard drive 614, CD/DVD Rom drive 616, and connection ports 608 to CPU 610. Multiple data entry devices may be provided, such as for example a keyboard 212. Multiple output devices may also be provided, such as for example a video monitor 206, a warning system 214 such as an alarm, and a printer (not shown). In at least one embodiment, chart library 208 is stored in hard drive 614. The sensor and location device are also typically connected to the system bus 606

Computer 208 may be a commercially available system, such as a desktop workstation unit provided by IBM, Dell Computers, Gateway, Apple, Sun Micro Systems, or other computer system provider. Computer 208 may be a common workstation as part of a ships network, providing an operator with access to any workstation the ability to interact with the RPINS 100. Computer 208 may also be a networked computer system, wherein memory storage components such as hard drive 614, additional CPUs 610 and output devices such as printers are provided by physically separate computer systems commonly tied together in the network. Those skilled in the art will understand and appreciate that physical composition of components and component interconnections comprising computer 208, and select a computer 208 suitable for the schedules to be established and maintained.

When computer 208 is activated, preferably an operating system 620 will load into main memory 612 as part of the boot strap startup sequence and ready the computer 208 for operation. At the simplest level, and in the most general sense, the tasks of an operating system fall into specific categories—process management, device management (including application and user interface management) and memory management.

In such a computer 208, the CPU 610 is operable to perform one or more of the route-planning and evaluation methods described above. Those skilled in the art will understand that a computer-readable medium 622 on which is a computer program 624 for performing route-planning and evaluation provided to the computer system 600. The form of the medium 622 and language of the program 624 are understood to be appropriate for computer 208. Utilizing the memory stores, such as for example one or more hard drives 614 and main system memory 612, the operable CPU 602 will read the instructions provided by the computer program 630 and operate to perform the RPINS 100 as described above.

Moreover, as indicated above, in at least one preferred embodiment RPINS 100 is implemented in a maritime environment as a system and method for planning and evaluating maritime routes. It is understood and appreciated that the principles as set forth above are equally applicable to other environments, and as such RPINS 100 is not intended for limitation to only maritime environments.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A route planning and evaluation method executed by a computer in a navigation system, comprising:
   receiving from a location device, a location and velocity for a host vessel;
   sensing data for at least one object in an environment proximate to the host vessel the data including navigation data;
   receiving from an electronic chart library a chart containing the location of the host vessel;
   displaying to an operator, the chart and a representation of the host vessel at current location and a representation of any sensed objects proximate to the host vessel;
   receiving from the operator and/or the retrieved chart, information including at least one navigation constraint and potential host vessel and object speed, the information being combined with the environmental data, location and velocity as collective route elements;
   generating, for a planning interval and subsequent planning intervals, a planned route for the host vessel and a predicted route for each sensed object by utilizing the navigation data, the routes being based upon the collective route elements, the planning interval being a time interval in which the planned and predicted routes are accepted as valid, the planned position of the host vessel and the predicted location for each sensed object displayed as an animation;
   evaluating the host vessel planned route by adjusting the animation;
   providing the animation only for each planning interval and animating from one planning interval to one of the subsequent intervals;
   predicting a proximate convergence of the host vessel and sensed object;
   signaling the proximate convergence to the operator;
   generating an alternate planned route or new waypoint;
   modifying the host vessel planned route according to the alternate planned route or new waypoint in response to the operator modifying one or more of the collective route elements; and
   adopting the alternate planned route as the current route in response to operator approval.

2. The route planning and evaluation method of claim 1, wherein the planning interval is adjustable by the operator.

3. The route planning and evaluation method of claim 1, wherein the environmental data is received by at least one sensor upon the host vessel.

4. The route planning and evaluation method of claim 1, wherein the navigation constraint is selected from the group of: a navigation rule, a waypoint, a keep out area, a minimum distance perimeter about an object, a destination, and combinations thereof.

5. The route planning and evaluation method of claim 1, wherein the environmental data includes data selected from the group consisting essentially of, the speed and direction of one or more ocean currents, the speed and heading of one or more detected objects, navigation data transmitted by nearby objects, and combinations thereof.

6. The route planning and evaluation method of claim 1, wherein a candidate planned route for the host vessel and the predicted route for each sensed object are continuously revised.

7. The route planning and evaluation method of claim 6, wherein the route generator signals the operator that a candidate planned route has been determined that is measurably superior to the current planned route.

8. The route planning and evaluation method of claim 1, wherein adjusting the animation includes stopping the animation and adjustably scrolling the animation forward or backwards.

9. The route planning and evaluation method of claim 1, wherein the route generator generates a manual planned route based on operator provided waypoints, each consecutive pair of waypoints defining a leg of the route.

10. The route planning and evaluation method of claim 1, wherein the method is stored on a computer-readable medium as a computer program which, when executed by a computer will perform the steps of route planning and evaluation.

11. The route planning and evaluation method of claim 1, wherein the route planning and evaluation method is a maritime route planning and evaluation method.

12. A maritime route planning and evaluation method executed by a computer in a navigation system, comprising:
   providing a planning interval and subsequent planning intervals, the planning interval being a time interval in which the planned and predicted routes are accepted as valid;
   receiving from a location device, a location and velocity for a host ship;
   sensing data for at least one object in an environment proximate to the ship, the data including navigation data;
   receiving from an electronic maritime chart library a chart containing the location of the ship;
   displaying to an operator, the chart and a representation of the host ship at current location and a representation of any sensed objects proximate to the ship;
   receiving from the operator and/or the retrieved maritime chart, information including at least one navigation constraint and potential host ship and object speed, the information being combined with the environmental data, location and velocity as collective route elements;
   generating a planned route for the host ship and a predicted route for each sensed object based upon the collective route elements for a first planning interval;
   displaying the routes to the operator, the planned position of the host ship and the predicted location for each sensed object, the planned position of the host ship and the predicted location for each sensed object being displayed as an animation;
   providing the animation only for each planning interval and animating from one planning interval to one of the subsequent intervals;
   predicting a proximate convergence of the host ship and an object;
   signaling the proximate convergence to the operator;
   generating an alternate planned route or new waypoint;
   modifying the host ship planned route according to the alternate planned route or new waypoint in response to the operator modifying one or more of the collective route elements;
   adopting the alternate planned route as the current route in response to operator approval; and
   repeating the generation of the planned route for a subsequent planning interval.

13. The maritime route planning and evaluation method of claim 12, wherein the environmental data is received by at least one sensor upon the host ship.

14. The maritime route planning and evaluation method of claim 12, wherein the navigation constraint is selected from the group of: a navigation rule, a waypoint, a keep out area, a minimum distance perimeter about an object, a destination, and combinations thereof.

15. The maritime route planning and evaluation method of claim 12, wherein the environmental data includes data selected from the group consisting essentially of, the speed and direction of one or more ocean currents, the speed and heading of one or more detected objects, navigation data transmitted by nearby ship objects, and combinations thereof.

16. The maritime route planning and evaluation method of claim 12, wherein a candidate planned route for the host ship and the predicted route for each sensed object are continuously revised.

17. The maritime route planning and evaluation method of claim 16, wherein the route generator signals the operator that a candidate planned route has been determined that is measurably superior to the current planned route.

18. The maritime route planning and evaluation method of claim 12, wherein adjusting the animation includes stopping the animation and scrolling the animation forwards or backward at adjustable time intervals.

* * * * *